United States Patent Office

3,032,405
Patented May 1, 1962

3,032,405
PROCESS FOR MAKING ALKALI METAL METABORATES AND COMPOSITIONS CONTAINING THE SAME
Ellen M. Mitchell, Long Beach, and John Yannacakis, Inglewood, Calif., assignors to United States Borax & Chemical Corporation, Los Angeles, Calif., a corporation of Nevada
No Drawing. Filed July 27, 1959, Ser. No. 829,540
13 Claims. (Cl. 71—2.2)

This invention relates as indicated to an improved process for making alkali metal metaborates, to a method for producing a co-crystallized alkali metal metaborate and sodium chlorate, and to a method of producing herbicides comprising alkali metal metaborates co-crystallized with sodium chlorate and various organic herbicidal materials.

Alkali metal metaborates such as sodium metaborate and potassium metaborate are well known and described in the literature.

The reaction by which alkali metal metaborates are formed may be illustrated as follows:

$$Na_2B_4O_7 \cdot 10H_2O + 2NaOH + 5H_2O \rightarrow 2Na_2B_2O_4 \cdot 8H_2O$$

and $$K_2B_4O_7 \cdot 4H_2O + 2KOH + 3H_2O \rightarrow 2K_2B_2O_4 \cdot 4H_2O$$

Various methods for the production of alkali metal metaborates have been proposed, all of which have inherent undesirable defects. For example, it is known that sodium metaborate can be made by the fusion of borax ($Na_2B_4O_7 \cdot 10H_2O$) and sodium carbonate with the evolution of carbon dioxide. This process results in an anhydrous product which is not only expensive to make but is completely unsuitable for many purposes, such as use in herbicides. Patents #1,976,299 and #2,886,425 teach methods for making sodium metaborate wherein caustic soda is reacted with borax. The entire amount of the caustic alkali, either in solution or dry, is mixed with the entire amount of borax. This results in a reaction which generates considerable heat, the ingredients become liquid and then turn into a thick, sticky, viscous mass which is extremely difficult to agitate. It is the opinion of the prior art, as shown in Patents #1,976,299 and #2,886,425, that agitation of the reaction mass is absolutely essential to the production of the metaborate. Thus using these prior art processes necessitates heavy expensive equipment equipped with cooling means in order to properly stir the viscous mass and to overcome the effects of the heat generated by the reaction.

Therefore, it is a principal object of this invention to provide an improved process for producing alkali metal metaborates.

Another object of this invention is to provide an improved process for producing a co-crystallized alkali metal metaborate and sodium chlorate.

A further object of this invention is to provide an improved process for producing a co-crystallized herbicide comprising alkali metal metaborate, sodium chlorate and an organic material.

Other objects will appear as the description proceeds.

To the accomplishment of the foregoing and related ends, the invention then comprises the features hereinafter fully described and pointed out in the claims, the following description setting forth in detail certain illustrative embodiments of the invention, these being indicative, however, of but a few ways in which the principle of the invention may be employed.

Broadly stated, the present invention comprises a process for producing an alkali metal metaborate having from about two to about eight molecules of water of crystallization, which comprises thoroughly agitating an alkali metal biborate and spraying said agitated biborate with an aqueous solution of an alkali metal hydroxide whereby the biborate is gradually converted to metaborate, said hydroxide solution added to said agitated biborate at a rate whereby the reaction mass remains substantially dry throughout such addition of hydroxide solution, said alkali metal hydroxide solution containing from about one to about two moles of alkali metal hydroxide for each mole of alkali metal biborate present and the total amount of water present during the conversion of the biborate to the metaborate being the amount necessary to produce an alkali metal metaborate having from about two to about eight molecules of water of crystallization, said water being limited to the water released from the biborate by the reaction of the biborate and the alkali metal hydroxide and the free water added by the alkali metal hydroxide solution.

It will be noted from the foregoing broadly stated paragraph that the alkali metal biborate and the alkali metal hydroxide are not simultaneously mixed together in their total amounts. Thus contrary to all prior teachings the alkali metal hydroxide solution is slowly added while the biborate is in a constant state of agitation and is added at such a rate where the reaction mass remains substantially dry throughout the conversion of the biborate to the metaborate.

Thus the present invention provides a process whereby the conversion of biborate to metaborate never goes through a liquid slurry stage to a viscous sticky mass before reaching the desired end product. Still further, by following the teachings of the present invention an excess of water is not required, there is no need to evaporate any water, and the process is completely independent of crystallization techniques. Another advantage is that the process produces a free-flowing granular product which is substantially dust free.

In the preferred embodiment of our process we use a rotary drum type of mixer. The alkali metal caustic is put into the mixer as a fine spray and as the tumbler rotates the particles of biborate fall through the mist of alkali metal hydroxide solution and are gradually converted to the metaborate. By using this method the individual particles of biborate are given a chance to contact the alkali metal hydroxide, the reaction is gradual, there is no sudden exothermic reaction with a large evolution of heat, and the heat of reaction between the individual biborate particles and alkali metal hydroxide is sufficient to keep the particles substantially dry as they are converted to the metaborate.

The amount of water of crystallization in the final alkali metal metaborate can be varied as desired by varying the concentration of the alkali metal hydroxide solution or by varying the type of alkali metal biborate used. The following equations are given to illustrate the possible reactions and the moles of free water necessary to dissolve the alkali metal hydroxide.

$$Na_2B_4O_7 \cdot 5H_2O + 2NaOH + 4.6H_2O \rightarrow 2Na_2B_2O_4 \cdot 5.3H_2O$$
$$Na_2B_4O_7 \cdot 10H_2O + 2NaOH + 5H_2O \rightarrow 2Na_2B_2O_4 \cdot 8H_2O$$
$$Na_2B_4O_7 \cdot 2.5H_2O + 2NaOH + 4.5H_2O \rightarrow 2Na_2B_2O_4 \cdot 4H_2O$$
$$Na_2B_4O_7 \cdot 3H_2O + 2NaOH + 8H_2O \rightarrow 2Na_2B_2O_4 \cdot 6H_2O$$

From these equations it becomes quite clear that it is a relatively simple matter to produce a metaborate with a predetermined water of crystallization. Thus by starting with borax (sodium biborate having 10 moles of water of crystallization) it is only necessary to dissolve two moles of caustic soda in 5 moles of water per mole of borax to produce a sodium metaborate having 8 moles of water of crystallization. While the above equations illustrate the use of sodium biborate and sodium hydroxide, the other alkali metal metaborates may be prepared in exactly the same manner by interaction of the desired alkali metal biborate and alkali metal hydroxide.

As previously noted, the present process is ideally suited to produce granular herbicides comprising the alkali metal metaborate in combination with sodium chlorate or various organic herbicides alone or in combination with both sodium chlorate and an organic herbicide.

In the preferred embodiment for making such herbicide combinations the alkali metal biborate and sodium chlorate and/or organic herbicide are placed in a rotary drum mixer. The ingredients are agitated by the tumbling action of the mixer and a 40–50% solution of alkali metal hydroxide is added as a fine spray at such a rate that the reaction temperature is kept below about 50° C. We have found that the sodium chlorate will gradually dissolve in the water set free by the reaction and will co-crystallize with the alkali metal metaborate soluble organic herbicides, such as the sodium salt of trichloroacetic acid, the sodium salt of trichlorobenzoic acid, the sodium salt of trichlorophenylacetic acid, etc., will also dissolve as does the sodium chlorate and co-crystallize with the alkali metal metaborate. If insoluble organic compounds such as 3-(p-chlorophenyl)-1,1-dimethylurea and the triazine derivatives are used, such materials will adhere to the metaborate-chlorate and also result in a free-flowing, dust-free, granular product.

The proportions of the alkali metal metaborate and sodium chlorate are immaterial to the present invention and may vary over relatively wide ranges, as for example the range of 20 to 70% sodium chlorate and 30 to 80% alkali metal metaborate. As for the amount of organic herbicide in combination with the metaborate alone or metaborate-chlorate, this again is immaterial to the present invention and the amounts of organic herbicide used is dictated by economics. It is to be clearly understood that any of the known organic herbicides can be incorporated with the present metaborate or metaborate-chlorate. For all practical purposes the organic herbicide would be added in amounts of from about 0.5% to about 10.0% based on the weight of the total composition.

So that the present invention can be more clearly understood, the following examples are given:

(I)

240 lbs. of granular sodium biborate having 5 moles of water of crystallization and a mesh size of −40 +100 (U.S. standard sieve) were put into a rotary drum mixer. A solution comprising 84 lbs. of water and 72 lbs. of sodium hydroxide was sprayed into the rotary drum mixer in such a manner that the particles of biborate continuously fell through the spray. The solution was sprayed into the drum at a rate whereby the reaction mass remained substantially dry throughout the conversion of the biborate to the metaborate.

After the addition of the sodium hydroxide solution was completed the drum containing the reaction was allowed to rotate for several minutes to insure the conversion was substantially complete.

The resultant product was about 396 lbs. of a granular free-flowing dust-free sodium metaborate having about 6.0 moles of water of crystallization and a particle size distribution substantially the same as the particle size of the sodium biborate starting material.

(II)

240 lbs. of the same granular sodium biborate used in the foregoing example and 200 lbs. of sodium chlorate were put into the mixing equipment used in Example I. A solution comprising 72 lbs. of sodium hydroxide dissolved in 84 lbs. of water was sprayed into the rotating drum in the same manner as in the above example. The sodium hydroxide solution was added at a rate whereby the temperature remained below about 50° C. throughout the reaction. At this rate of addition of the sodium hydroxide solution the mass remained substantially dry.

The resultant product was about 596 lbs. of a granular free-flowing substantially dust-free co-crystallized sodium metaborate-sodium chloride.

(III)

Example II was repeated except that 6 lbs. of the sodium salt of trichlorobenzoic acid was added to the biborate-chlorate mix.

The resultant product was about 602 lbs. of a granular free-flowing substantially dust-free co-crystallized metaborate-chlorate-trichlorobenzoate herbicide.

This herbicide can either be dissolved in water and sprayed on noxious weeds or it can be distributed around noxious weeds in its solid granular form.

(IV)

Example III was repeated except that about 6 lbs. of 3-(p-chlorophenyl)-1,1-dimethylurea was added to the biborate-chlorate mix.

The resultant product was about 602 lbs. of a granular free-flowing substantially dust-free herbicide. This material due to the presence of the insoluble organic herbicide in the granules is best used in its solid form.

The invention, as shown in the above examples, has been described in connection with sodium biborate and sodium hydroxide, because of their availability and economic advantages. It will be quite apparent that potassium and lithium are the full equivalent of sodium in this connection, and it is the contemplation of this invention to include all the alkali metal biborates and alkali metal hydroxides as reactants to produce the corresponding alkali metal metaborates.

From the foregoing discussion it will be seen that the present invention has provided a means for preparing alkali metal metaborates by reacting an alkali metal biborate with an alkali metal hydroxide in a substantially dry state. The reaction mass never becomes wet, sticky and viscous and therefore difficult to mix. The process requires no outside heat, the temperature of reaction is readily regulated by controlling the rate of addition of the alkali metal hydroxide solution and the end product is dry, needing no further evaporation or drying. The reaction takes place readily, requires simple equipment, and the particle size of the end product is completely independent of any crystallization techniques. The method is economical for formulating herbicidal compositions having relatively high percentages of active ingredients.

The herbicides produced by the present process are granular and thus may be applied dry; they are highly soluble (depending on whether a soluble or insoluble organic material is used) if application by spraying is desired. The present process can be used to produce metaborate-chlorate herbicide combinations; metaborate-organic (containing both soluble and insoluble organics) herbicide combinations; or metaborate-chlorate-organic herbicide combinations, all of which are granular, free-flowing and substantially dust free.

It is also to be noted that the present process can be used to prepare basic borates with ratios of alkali oxide to boric oxide of from about 1:2 to about 1:1, or, in other words, borates between biborates and metaborates. This can easily be accomplished by merely varying the amount of alkali metal hydroxide which is to be reacted with the biborate.

Other modes of applying the principle of the invention may be employed provided the features stated in any of the following claims or the equivalent of such be employed.

We, therefore, particularly point out and distinctly claim as our invention:

1. A process for preparing an alkali metal metaborate having from about two to about eight molecules of water of crystallization, which comprises thoroughly agitating an alkali metal biborate and spraying said agitated biborate with an aqueous solution of an alkali metal hydroxide whereby the biborate is gradually converted to metaborate, said hydroxide solution added to said agitated biborate at a rate whereby the reaction mass remains substantially dry throughout such addition of hydroxide solution, said alkali metal hydroxide solution containing from about one to about two moles of alkali metal hydroxide for each mole of alkali metal biborate present and the total amount of water present during the conversion of the biborate to the metaborate being the amount necessary to produce an alkali metal metaborate having from about two to about eight molecules of water of crystallization, said water being limited to the water released from the biborate by the reaction of the biborate and the alkali metal hydroxide and the free water added by the alkali metal hydroxide solution.

2. A process in accordance with claim 1 in which the alkali metal biborate is sodium biborate having five molecules of water of crystallization.

3. A process in accordance with claim 1 in which the alkali metal biborate is sodium biborate having ten molecules of water of crystallization.

4. A process in accordance with claim 1 in which the alkali metal hydroxide is sodium hydroxide.

5. A process in accordance with claim 1 in which two moles of alkali metal hydroxide are added for each mole of biborate present.

6. A process for making a co-crystallized hydrated alkali metal metaborate-sodium chloride, which comprises thoroughly agitating a mixture of a hydrated alkali metal biborate and sodium chloride and spraying said agitated mixture with an aqueous solution of an alkali metal hydroxide whereby the biborate is gradually converted to metaborate, said hydroxide solution added to said agitated mixture at a rate whereby the reaction mass remains substantially dry throughout such addition of hydroxide solution, said sodium chlorate being dissolved in the water released from the reaction between the biborate and the alkali metal hydroxide and the free water added by the hydroxide solution and being co-crystallized with the hydrated metaborate, the total quantity of water present being sufficient to produce a metaborate having from about two to about eight molecules of water of crystallization, and said alkali metal hydroxide solution containing about two moles of alkali metal hydroxide for each mole of biborate present.

7. A process in accordance with claim 6 which includes adding an organic herbicide to the alkali metal biborate-sodium chlorate mixture.

8. A process in accordance with claim 7 which includes spraying the alkali metal hydroxide solution at such a rate that the reaction temperature remains below about 50° C.

9. A process in accordance with claim 6 in which the biborate is sodium biborate pentahydrate.

10. A process in accordance with claim 6 in which the biborate is sodium biborate decahydrate.

11. A process in accordance with claim 6 in which the alkali metal hydroxide is sodium hydroxide.

12. A process in accordance with claim 6 which includes adding a water soluble organic herbicide to the alkali metal biborate-sodium chlorate mixture.

13. A process in accordance with claim 6 which includes adding a water insoluble organic herbicide to the alkali metal biborate-sodium chlorate mixture.

References Cited in the file of this patent

UNITED STATES PATENTS

| | | |
|---|---|---|
| 2,741,545 | Nielsson | Apr. 10, 1956 |
| 2,847,293 | Harris et al. | Aug. 12, 1958 |
| 2,886,425 | Seibert | May 12, 1959 |
| 2,904,423 | Stone et al. | Sept. 15, 1959 |
| 2,945,747 | Nielsson | July 19, 1960 |